United States Patent

[11] 3,603,964

[72] Inventor Lee Harrison, III
Englewood, Colo.

[21] Appl. No. 697,512
[22] Filed Jan. 12, 1968
Continuation-in-part of Ser. No. 607,078, Jan. 3, 1967, Pat. No. 3,364,382, which is a Continuation of Ser. No. 240,970, Nov. 29, 1962, abandoned.
[45] Patented Sept. 7, 1971
[73] Assignee Computer Image Corporation
Denver, Colo.

[54] MEANS AND METHOD FOR SEMI-AUTOMATICALLY SEQUENCING THE GENERATION OF COMPONENTS FOR AN ELECTRONIC IMAGE DISPLAY
10 Claims, 3 Drawing Figs.

[52] U.S. Cl. ........ 340/324 A, 178/75 D
[51] Int. Cl. ........ G06f 3/14
[50] Field of Search ........ 340/324.1; 235/150.53, 151; 35/10.4; 178/7.5 D

[56] References Cited

UNITED STATES PATENTS

| | | | |
|---|---|---|---|
| 3,364,382 | 1/1968 | Harrison | 340/324 |
| 2,975,671 | 3/1961 | Hemstreet | 178/7.5 D |
| 3,110,802 | 11/1963 | Ingham et al. | 340/324.1 |
| 3,309,659 | 3/1967 | Balding | 35/10.4 |
| 3,333,260 | 7/1967 | Olson | 340/324.1 |
| 3,335,315 | 8/1967 | Moore | 340/324.1 |

*Primary Examiner*—John W. Caldwell
*Assistant Examiner*—Marshall M. Curtis
*Attorney*—Kingsland, Rogers, Ezell, Eilers & Robbins

ABSTRACT: A network for sequencing the generation of parts for the display of an electronically generated image using signals established and controlled according to the viewing angle of the display subject. For sequencing purposes, parts of the display are assigned to sets of three groups connected in a closed loop. Depending upon the angle of viewing the display subject, selective transmission of enabling signals determines which group will start the sequence and in which order the other two groups will follow.

INVENTOR:
LEE HARRISON III

MEANS AND METHOD FOR SEMI-AUTOMATICALLY SEQUENCING THE GENERATION OF COMPONENTS FOR AN ELECTRONIC IMAGE DISPLAY

This is a continuation-in-part of application, Ser. No. 607,078, filed Jan. 3, 1967, now U.S. Pat. No. 3,364,382, which is a continuation of application, Ser. No. 240,970 filed Nov. 29, 1962, the latter having been abandoned.

BRIEF DESCRIPTION OF THE INVENTION

An electronic image generator is provided according to the aforesaid Lee Harrison III patent. It generates X, Y and Z voltages which are resolved with H and V dimensions for controlling the beam of a display oscilloscope while simultaneously controlling parallel scanning of an overlap prevention device. As is clear from the Lee Harrison III patent, proper sequence of the generation of members, objects and other parts of the display is important for the correct operation of the overlap prevention device (the vidicon tube network 845 in the embodiment of the Lee Harrison III patent. Thus, as described in the Lee Harrison III patent, overlap in a display is prevented by the trace on a vidicon tube in parallel with drawing of the display by the beam of a display tube. Whenever the beam of the vidicon tube, as it moves parallel to the beam of the display tube, traces a place on the face of the vidicon tube already traced by the vidicon tube beam, the display tube beam is blanked to prevent overlap. In this way, the vidicon tube prevents the display tube beam from drawing more than one part of the display subject on the face of the display tube. Consequently, as as appears from the Lee Harrison III patent, the operator must select the sequence of drawing the display subject such that he begins with the parts of the display subject that are in front of other parts as viewed on the display tube. For example, if the left side of a human character is to be viewed, the left arm should be drawn before the upper torso so that on subsequent drawing of the torso, its portion behind the left arm will not be drawn because of the overlap prevention device. If the sequence were improper and the upper torso was drawn before the left arm, the vidicon tube would blank out the display tube beam during subsequent drawing of the left arm.

For some other applications, such as generation of shadow voltages as by the Lee Harrison III application filed contemporaneously herewith on Jan. 12, 1968, entitled "Means and Method For Generating Shadows and Shading For An Electronically Generated Display" Ser. No. 697,456, now U.S. Pat. No. 3,441,789, a sequence of generating X, Y and Z voltages different from the sequence for overlap prevention may be required.

For both proper overlap prevention and shadow generation, the required sequence depends upon a two dimensional plane of viewing the three-dimensional subject, e.g., the plane normal to the viewer's viewing axis and the plane normal to the direction of the light source.

In this invention, a system is provided for sequencing the drawing of each combination of three groups of physical parts of the display. The system is based upon organizing a three-dimensional display subject into coordinate sides and planes that, when selectively combined, properly define a viewing plane to establish the necessary sequence of operation of the electronic image generator. The three groups of physical parts are connected in a closed chain. Therefore, any sequence is possible because the system determines with which group to start and in what direction to follow around the closed chain.

The example illustrated in this application supposes a human figure defined in three dimensions by the X, Y and Z coordinate voltages such as are produced by the Lee Harrison III Pat. No. 3,364,382. The groups of members of the figures which are drawn include head and chest, hips, right arm, left arm, right leg, and left leg. Each group may include a series or subgroup of its own members, as the upper arm, lower arm, hand, and fingers of each arm group, etc. The concepts of this invention may be used to sequence the generation of voltages representing any ones of the subgroups as well as more complex group combinations, such as those representing a human figure, a furniture group, and an animal. These simple subgroups to complex sets of groups may be sequenced by this invention. The same approach of organizing the information into a series of three groups and incorporating the sequencing system applies for complex or simple groups.

Figures 1, 2, 3:
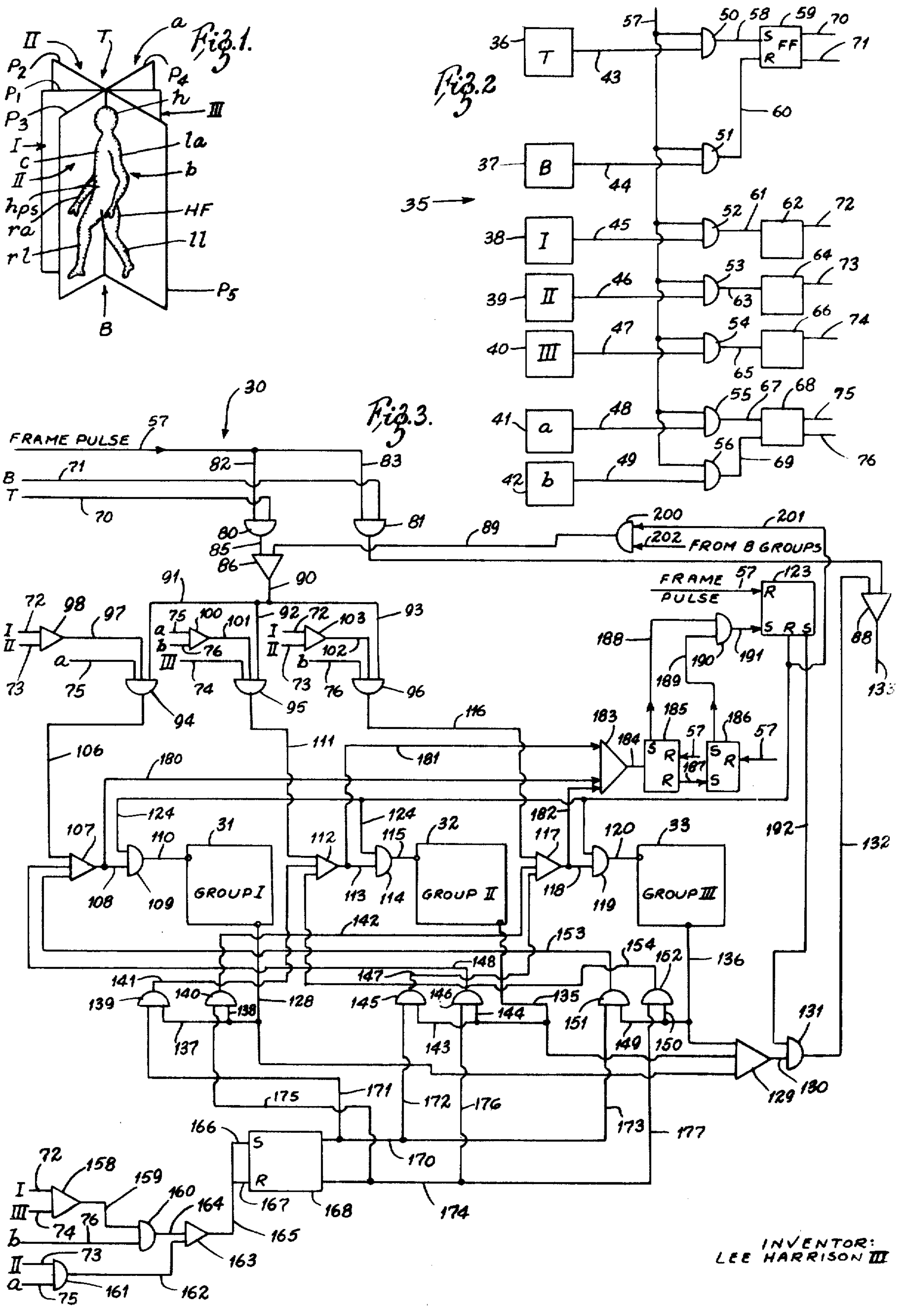
FIG. 1 is a diagrammatic drawing illustrating reference planes through a display subject for determining the programming of the sequencing network.
FIG. 2 is a schematic diagram of typical push button connections for controlling the sequencing network.
FIG. 3 is a schematic diagram of the sequencing network.

In the example of a display subject with which the sequencing network of this invention is described, it is assumed that the electronic image generator of the kind described in the Lee Harrison III Pat. No. 3,364,382 is set to generate voltages representing the three-dimensional X, Y and Z components of a human figure HF and that this human figure HF has one group of members comprising the head *h* and chest *c*, another group comprising the hips *hps*, another group comprising the right arm *ra*, another group comprising the left arm la, another group comprising the right leg *rl*, and another group comprising the left leg ll. It is necessary that these various groups be generated in the proper sequence for proper functioning of the overlap prevention device or of the shadow generating network or both.

For determining input control to the sequencing network in relation to how the display subject is oriented from the viewer's point of view, the display subject HF is though of as separated by a plane $p_1$ through the longitudinal medial center of the display subject HF, dividing the display subject into halves viewed from either the right side a or the left side b. The display subject is further divided into diagonal, mutually perpendicular planes $P_2$, $P_3$, $P_4$, and $P_5$ at 45° angles to the $P_1$ plane. Viewing toward the frontal plane between the planes $P_2$ and $P_3$ is designated I; toward either sagital plane, between the planes $P_2$ and $P_4$ or between the planes $P_3$ and $P_5$ is designated II; and toward the back plane between the planes $P_4$ and $P_5$ is designated III. With this conceptual division of the display subject HF into planes and with respect to shadow generation or overlap prevention from which the subject is viewed, any desired combination can be established for proper sequencing the generation of voltages for drawing the figure on a display oscilloscope.

In the example illustrated in FIG. 3, the sequencing network 30 sequences the operation of generators 31, 32 and 33 which correspond to first, second and third groups of members of the display subject HF. In this example, it may be assumed that the generator 31 corresponds to the right arm group *ra*, the generator 32 corresponds to the head and chest group *hc*, and the generator 33 corresponds to the left arm group *la*. Each of these generators 31, 32 and 33 comprises a network for generating voltages corresponding to lengths and voltages corresponding to parameters setting the angular positions of individual parts of the members. For example, the group 31 corresponds to the network shown in FIG. 2 of the aforesaid Lee Harrison III Pat. No. 3,364,382, with the other systems and networks of that Pat. for generating voltages corresponding to the locations of surfaces of the members (skin), for combining various voltages, for preventing overlap, for shading, and so forth, and for displaying the subject.

A control network 35 for the sequencing network 30 is illustrated in FIG. 2. The network 35 comprises a plurality of devices for establishing signals, which may be a plurality of pushbuttons, together an arrangement of "and" gates and flip-flops for coordinating and timing the signals with one another and with a frame pulse. One pushbutton 36 corresponds to T, a pushbutton 37 corresponds to B, a pushbutton 38 to I, a pushbutton 39 corresponding to II, a pushbutton 40 corresponds to III, a pushbutton 41 corresponds to *a*, and a pushbutton 42 corresponds to *b*. The pushbuttons 36, 37, 38, 39, 40, 41, and 42, when depressed, deliver voltages through conductors 43, 44, 45, 46, 47, 48, and 49, respectively, to separate "and" gates 50, 51, 52, 53, 54, 55 and 56, respectively. Another conductor 57 also delivers a pulse to the "and" gates 50–56 between each frame of the generation of a display subject. The signal carried by the conductor 57 may correspond to the frame pulse carried by the conductor 57 may correspond to the frame pulse carried by the conductor 42 of the Lee Harrison III Pat. No. 3,364,382.

An output conductor 58 from the "and" gate 50 constitutes the "set" input to a flip-flop 59. An output conductor 60 from the "and" gate 51 constitutes the "reset" input to the flip-flop 59. An output conductor 61 from the "and" gate 52 constitutes the "set" input to a flip-flop 62, an output conductor 63 from the "and" 53 constitutes the "set" input to a flip-flop 64, and an output conductor 65 constitutes the "set" input to a flip-flop 66. An output conductor 67 constitutes the "set" input to a flip-flop 68 and an output conductor 69 from the "and" gate 56 constitutes the "reset" input to the flip-flop 68. The flip-flop 59 has a "set" output conductor 70 and a "reset" output conductor 71. The flip-flop 62 has a "set" output conductor 72, the flip-flop 64 has a "set" output conductor 73, the flip-flop 66 has a "set" output conductor 74. The flip-flop 68 has a "set" output conductor 75 and a "reset" output conductor 76.

It is apparent that the "and" gates 50–56 can pass a pulse only when there is a signal in the conductor 57. Also, whether there is an output from the flip-flops 59, 62, 64, 66 and 68 depends upon which of the buttons 36–42 are depressed. These buttons are arranged (by means not shown) so that only one of the two buttons 36 and 37 can be depressed at any time, only one of the three buttons 38, 39 and 40 can be depressed at any time, and only one of the two buttons 41, and 42 can be depressed at any time.

The T output conductor 70 from the flip-flop 59 is connected as an input to an "and" gate 80. The B output conductor 71 from the flip-flop 59 is connected as an input to an "and" gate 81. The conductor 57 carrying the pulse between frames has branch conductors 82 and 83 connected to the "and" gates 80 and 81, respectively. An output conductor 85 from the "and" gate 80 leads to an "or" gate 86 of the network of FIG. 3. An output conductor 87 from the "and" gate 81 leads to an "or" gate 88 for a similar network like that of FIG. 3 for sequencing groups for the right leg *rl*, hips *hps*, and left leg ll similar to the groups 31, 32, and 33 of FIG. 3. Another conductor 89 connected as an input to the "or" gate 86 leads from that network with which the "or" gate 88 is associated.

An output conductor 90 from the "or" gate 86 is connected by branch conductors 91, 92 and 93 to three "and" gates 94, 95 and 96, respectively. Another conductor 97 leading to the "and" gate 94 is connected to the output of an "or" gate 98 having the I and II conductors 72 and 73 connected to it as inputs. A third input to the "and" gate 94 is the conductor 75, carrying the voltage transmitted by depression of a button 41.

The a and b conductors 75 and 76 are connected to an "or" gate 100 which has an output conductor 101 connected to the "and" gate 95. The III conductor 74 constitutes another input to the "and" gate 95.

A conductor 102 leading from an "or" gate 103 is connected to the "and" gate 96. The I and II conductors 72 and 73 are connected as inputs to the "or" gate 103. The b conductor 76 is another input to the "and" gate 96.

A conductor 106 leads from the "and" gate 94 to an "or" gate 107. An output conductor 108 from the "or" gate 107 leads to an "and" gate 109 which has an output conductor 110 leading to the generator network 31.

An output conductor 111 leads from the "and" gate 95 to an "or" gate 112, a conductor 113 connects the "or" gate 112 to an "and" gate 114, and there is a conductor 115 from the "and" gate 114 to the generator network 32.

A conductor 116 leads from the "and" gate 96 to an "or" gate 117. There is a conductor 118 between the "or" gate 117 and an "and" gate 119, and a conductor 120 between the "and" gate 119 and the generator network 33.

The frame pulse conductor 57 also is connected to the "reset" input of a flip-flop 123. A conductor 124 is connected to the "reset" output of the flip-flop 123 and is also connected to the three "and" gates 109, 114 and 119.

There is a conductor 128 leading from the output of the first generator network group 31. This conductor 128 corresponds to the conductor 142 in FIG. 2 of the Lee Harrison III Pat. No. 3,364,382 that delivers a pulse from the first member generator (an arm in the example of the Lee Harrison III Pat. to the next member generator. The conductor 128 is connected to an "or" gate 129 having an output conductor 130 leading to an "and gate 131. A conductor 132 connects the "and" gate 131 to the "or" gate 88. A conductor 133 from the "or" gate 88 leads to the sequence control network for the next three groups of members (such as the right leg *rl*, the hips *hps*, and the left leg *ll*).

A conductor 135 is connected from the output side of the generator network group 32 to the "or" gate 129. Another conductor 136 is connected from the output of the generator network group 33 to the "or" gate 129.

The conductor 128 at the output of the group 31 has a pair of conductors 137 and 138 connecting it to a pair of "and" gates 139 and 140. An output conductor 141 from one of the "and" gates 139 is connected to the "or" gate 112. An output conductor 142 from the other "and" gate 140 is connected to the "or" gate 117.

The conductor 135 at the output of the group 32 has two branch conductors 143 and 144 connected to a pair of "and" gates 145 and 146. A conductor 147 connects the "and" gate 145 to the "or" gate 117. Another conductor 148 connects the "and" gate 146 to the "or" gate 107.

There are branch conductors 149 and 150 from the group 33 output conductor 136 to a pair of "and" gates 151 and 152. A conductor 153 connects the "and" gate 151 to the "or" gate 107. Another conductor 154 connects the "and" gate 152 to the "or" gate 112.

The output conductors 72 and 74 from the flip-flops 62 and 66 are connected to an "or" gate 158 which has a conductor 159 connecting it to an "and" gate 160. The conductor 76 from the "reset" output of the flip-flop 68 is also connected to the "and" gate 160. The conductors 73 and 75 from the flip-flop 64 and the "reset" output of the flip-flop 68 are connected to an "and" gate 161 which has an output conductor 162 connecting it to an "or" gate 163. An output conductor 165 from the "or" gate 163 is connected to the "set" input 166 and "reset" input 167 of a flip-flop 168.

There is an output conductor 170 connected to the "set" output of the flip-flop 168 and having branch conductors 171, 172 and 173 connected to the "and" gates 139, 145 and 151, respectively. An output conductor 174 is connected to the "reset" output of the flip-flop 168 and it has branch conductors 175, 176 and 177 connected to the "and" gates 140, 146 and 152, respectively.

The flip-flop 168 is normally in its "reset" state and is flipped to its "set" state whenever there is a signal in the conductor 166. In its "set" condition, the flip-flop 168 transmits a signal to the "forward" conductor 170. In its "reset" condition, the flip-flop 168 transmits a signal to the "backward" conductor 174.

There are conductors 180, 181 and 182 leading from the output from the "or" gates 107, 112 and 117, respectively, to an "or" gate 183. A conductor 184 is connected to a pair of flip-flops 185 and 186 (forming a counter) that are connected together by a conductor 187 and that have outputs 188 and 189 connected to an "and" gate 190. The output 191 from the "and" gate 190 is connected to the "set" input of the flip-flop 123. The counter flip-flops 185 and 186 are connected to provide inputs in the conductors 188 and 189 on a three-pulse count. The flip-flop 123 has a "set" output conductor 192 connected to the "and" gate 131.

An "and" gate 200 has its output connected to the conductor 89. One input to the "and" gate 200 is delivered by a conductor 201 connected from the "reset" output conductor 124 of the flip-flop 123. Another input conductor 202 to the "and" gate leads from the next sequencing network.

OPERATION

To operate this sequence network control 30, the viewing angle or plane normal to the point of view of the subject is first determined. In the example of FIG. 1, the figure HF is viewed between the imaginary planes $P_3$ and $P_5$ and from the top and on the b side of plane $P_1$. Therefore, the buttons which are pressed in the network 35 are the button 36 corresponding to T, the button 39 corresponding to II, and the button 42 corresponding to *b*.

Depression of the I and b buttons 38 and 42 produces output pulses in the conductors 72 and 76 at the time there is a pulse in the frame pulse or between-frame pulse conductor 57. Since these conductors 72 and 76 are connected to the "and" gate 96, these buttons 38 and 42 establish the group III network 33 as the starting or first group, the depression of the T button 36 having sent a signal through the conductor 70, the "and" gate 80, and the "or" gate 86 to the "and" gate 96.

Depression of the II and b buttons 39 and 42 produces no signal to the conductor 165 because the "and" gates 160 and 161, having no signals in their input conductors 159 and 73, do not pass voltage signals. Therefore, the flip-flop 168 remains in its "reset" state. The control of signal transmission established by the "and" gates and "or" gates 158, 160, 161, and 163 and their respective inputs correctly "sets" or "resets" the flip-flop 168 for every possible viewing angle of the display subject HF. These inputs are controlled so that the closed chain of group networks 31, 32 and 33 will always operate forward or backward in appropriate correlation to which of the buttons are depressed corresponding to the selected viewing angle.

In the present example, with the flip-flop 168 in "reset," a voltage signal is transmitted through the "reset" output conductor 174 through the conductors 175, 176 and 177 to the "and" 140, 146, and 152 respectively. Since there is a signal in the "and" gate 152 (and not in the conductor 173 to the "and" gate 151), the sequence will be from the group 33 in a backward direction to the group 32 and then to the group 31 because the input conductor 150 connected to the output/conductor 136 from the group 133 can pass its signal through the "and" gate 152 but not through the "and" gate 151.

Thus, the conductor 116 supplies a signal to the "or" gate 117, through the conductor 118, the "and" gate 119, and the conductor 120 to the group III generator network 33. At the same time, a pulse is supplied through the conductor 182 to the "or" gate 183 to flip the flip-flop 185 from "reset" to "-set." This produces a "0" output in the conductor 187 and does not flip the flip-flop 186, which remains in its "reset" state.

When the group III generator network 33 has completed drawing the right arm group, its output is supplied to the group II generator network 32 through the conductor 136, the "and" gate 152, the conductor 154, the "or" gate 112, the conductor 113, the "and" gate 114, the conductor 115. The group II generator network 32 draws the head and chest in the manner described in the Lee Harrison III Pat. No. 3,364,382.

When the signal is supplied to the group II generator network 32 in the conductor 113, a pulse is also transmitted through the conductor 181 to the "or" gate 183 and the conductor 184 to flip the flip-flop 185 to its "reset" state. This generates a signal through the conductor 187 to flip the flip-flop 186 to its "set" state, producing a signal in the "set" output conductor 189 to the "and" gate. However, now, since there is no signal in the "reset" output conductor 188 from the flip-flop 185, the "and" gate 190 does not transmit a signal to its output conductor 191.

Upon completion of operation of the group II generator network 32, there is an output pulse to the group I generator network 31 through the conductor 135, the conductor 144, the "and" gate 146, the conductor 148, the "or" gate 107, the conductor 108, the "and" gate 109, and the conductor 110. The group I generator network 31 generates the drawing of the left arm group in the manner described in the Lee Harrison III Pat. No. 3,364,382.

Upon supplying a signal through the conductor 108 to the group I generator network 31, a pulse is transmitted through the conductor 180 and the "or" gate 183 to flip the flip-flop 185 again to its "set" state. This transmits a pulse in the conductor 188, and since the flip-flop 186 is already in its "set" state, there are signals in both the conductors 188 and 189 to the flip-flop 123 to flip it from its "reset" state to its "set" state. This means there is no signal in the "reset" output conductor 124 to the "and" gates 109, 114 and 119 and there is a signal in the output conductor 192. Therefore, the chain of the group generator networks 31, 32 and 33 is disabled, and the "and" gate 131 is enabled. Hence, the output signal from the group I generator network 31 carried by the conductor 128 cannot be transmitted to either of the other two groups 32 or 33, but it can be transmitted to the "or" gate 129, the conductor 130, the "and" gate 131, the conductor 132, and the "or" gate 88 to the conductor 133 leading to the next sequencing control, which is similar to the sequence network 30 but sequences the drawing of the bottom or "B" group of members (left leg ll, hips *hps*, and right leg *rl*).

The gate 200 is disabled upon the achievement of a "set" state in the flip-flop 123 by putting a zero signal in the conductor 201, thus preventing the output from the "B" group in the conductor 202 from restarting the "T" group before another frame pulse comes along. Also, the frame pulse in the conductor 57 flips the flip-flops 185 and 186 back to their "reset" states.

Various changes and modifications may be made within the purview of this invention as will be readily apparent to those skilled in the art. Such changes and modifications are within the scope and teaching of this invention as defined by the claims appended hereto.

I claim:

1. In a system for automatically generating and displaying animated figures in two dimension from electrical signals defining the figure in three dimensions, the system having a plurality of signal generators each of which includes means for generating a plurality of voltages each representing the length of a physical part of a display figure, means for generating a plurality of position voltages representing angular position parameters of the length voltages with respect to reference coordinates, means for generating vector voltages corresponding to the distances of the surfaces of the physical parts from their axes, means for continuously combining the vector voltages with the length voltages, and wherein the proper sequence of operation of the signal generators affects the final display; a network for sequencing the operation of the signal generators comprising electrical conductor means for connecting the signal generators in a closed loop thereby connecting the signal generators in a closed series, means to generate a start signal, means for establishing a plurality of input signals related to the orientation of the figure, means response to selected ones of the said plurality of input signals for enabling a selected one of the signal generators as the first to operate upon generation of the start signal, and gating means operable in response to selected ones of the said plurality of input signals for selectively establishing the direction around the closed loop for sequencing the order in which the remaining signal generators will operate.

2. The network of claim 1 wherein the signal generators are connected in groups of three signal generators, means for connecting the three signal generators in three closed loops, the gating means including gates for closing one loop for transmission of electrical signals and opening the other two loops according to which ones of the said plurality of input signals are selected.

3. The network of claim 1 wherein the means for establishing a plurality of input signals comprises means for establishing a selected three from a total of seven input signals.

4. The network of claim 3 including means for connecting the seven input signal establishing means in three groups, the first group comprising means to select one of two input signals, the second group comprising means to select one of three input signals, and the third group comprising means to select one of two input signals.

5. The network of claim 2 including means to initiate operation of the sequencing network for a second group of three signal generators following operation of the sequencing network for a first group of three signal generators.

6. In a system for automatically generating and displaying animated figures in two dimension from electrical signals defining the figure in three dimensions, the system having a plurality of signal generators each of which includes means for generating a plurality of voltages each representing the length of a physical part of a display figure, means for generating a plurality of position voltages representing angular position parameters of the length voltages with respect to reference coordinates, means for generating vector voltages corresponding to the distances of the surfaces of the physical parts from their axes, means for continuously combining the vector voltages with the length voltages, and wherein the proper sequence of operation of the signal generators affects the final display; a method for using a sequencing network for sequencing the operation of the signal generators comprising the steps of connecting the signal generators in a closed loop thereby connecting the signal generators in a closed series, generating a start signal having a predetermined relationship to the orientation of the display figure, enabling a selected one of the signal generators as the first to operate in response to generation of the start signal, and controlling with electrical signals having a predetermined relationship to the orientation of the display figure the direction around the closed loop for sequencing the order in which the remaining signal generators will operate.

7. The method of claim 6 including the steps of connecting the signal generators in groups of three signal generators, connecting the three signal generators in three closed loops, and closing one loop for transmission of electrical signals and opening the other two loops according to which ones of the said plurality of input signals are selected.

8. The method of claim 6 including the steps of establishing a selected three from a total of seven input signals for performing the enabling and closing steps.

9. The method of claim 8 including the steps of connecting the seven input signals in three groups, the first group having two input signals, the second group having three input signals, and the third group having two input signals.

10. The method of claim 7 including the step of initiating operation of the sequencing network for a second group of three signal generators following operation of the sequencing network for a first group of three signal generators.